United States Patent
Tsimmerman et al.

(10) Patent No.: US 9,506,213 B2
(45) Date of Patent: Nov. 29, 2016

(54) RECTILINEAR CONNECTOR FOR PILE, PANELS, AND PIPES

(71) Applicant: Omega Trestle LLC, Clearwater, FL (US)

(72) Inventors: Valery Tsimmerman, Brookeville, MD (US); Kevin Edward Lathan, Clearwater, FL (US)

(73) Assignee: Omega Trestle LLC, Clearwater, FL (US)

( * ) Notice: Subject to any disclaimer, the term of this patent is extended or adjusted under 35 U.S.C. 154(b) by 0 days.

(21) Appl. No.: 15/068,013

(22) Filed: Mar. 11, 2016

(65) Prior Publication Data

US 2016/0265182 A1    Sep. 15, 2016

Related U.S. Application Data

(60) Provisional application No. 62/131,395, filed on Mar. 11, 2015.

(51) Int. Cl.
*E02D 5/00* (2006.01)
*E02D 5/08* (2006.01)
(Continued)

(52) U.S. Cl.
CPC . *E02D 5/08* (2013.01); *E02D 5/02* (2013.01); *E02D 7/00* (2013.01); *F16B 5/0044* (2013.01); *E02D 2600/20* (2013.01)

(58) Field of Classification Search
CPC ............. E02D 5/02; E02D 5/03; E02D 5/04; E02D 5/06; E02D 5/08; E02D 5/14
See application file for complete search history.

(56) References Cited

U.S. PATENT DOCUMENTS

| 981,018 A | * | 1/1911 | Sheldon | ................ E02D 5/04 405/281 |
| 2,287,018 A | * | 6/1942 | Blumenthal | .......... E02D 5/04 405/278 |

(Continued)

FOREIGN PATENT DOCUMENTS

| CA | 2156311 A1 * | 3/1997 | ............. E02D 31/00 |
| CN | 201428137 | 3/2010 | |
| JP | 200073361 | 3/2000 | |

OTHER PUBLICATIONS

International Search Report and Written Opinion issued Jun. 6, 2016 for corresponding international PCT patent application No. PCT/US2016/021997 with an international filing date of Mar. 11, 2016.

*Primary Examiner* — Benjamin Fiorello
(74) *Attorney, Agent, or Firm* — Nicholas Pfeifer; Smith & Hopen, P.A.

(57) ABSTRACT

The present invention includes an interlock having an elongate male plug and an elongate female socket. The socket has an open rectangular cross-section with a receiving cavity designed to receive and ensleeve the plug, which also has a rectangular cross-section. The socket includes a back wall, top wall, bottom wall, and a discontinuous front wall creating an upper and lower flange with an opening existing between the free ends of the flanges. The bottom, top, and back walls are planar in shape providing three planes on which the socket can mate to a planar portion of a structure, such as a sheet pile. The plug includes a flange-contacting surface with a pile receipt disposed inwardly from the flange-contacting surface. The inwardly set pile receipt allows an end of a plate to be secured to the plug within the outer perimeter of the plug resulting in an obstruction free flange-contacting surface.

16 Claims, 10 Drawing Sheets

(51) Int. Cl.
  *E02D 5/02* (2006.01)
  *E02D 7/00* (2006.01)
  *F16B 5/00* (2006.01)

(56) References Cited

U.S. PATENT DOCUMENTS

| | | | | |
|---|---|---|---|---|
| 5,066,353 A | * | 11/1991 | Bourdo | E02B 3/04 156/300 |
| 5,447,393 A | * | 9/1995 | Yeates | E02D 7/20 405/274 |
| 5,967,701 A | * | 10/1999 | Berkley | E02D 5/03 405/274 |
| 2008/0310924 A1 | * | 12/2008 | Heindl | E02D 5/08 405/279 |
| 2009/0191008 A1 | * | 7/2009 | Heindl | E02D 5/08 405/279 |
| 2009/0214301 A1 | | 8/2009 | Heindl | |
| 2009/0311052 A1 | * | 12/2009 | Heindl | E02D 5/06 405/278 |
| 2010/0151269 A1 | | 6/2010 | Hermes | |
| 2012/0269583 A1 | * | 10/2012 | Heindl | E02D 5/08 405/251 |

* cited by examiner

RECTILINEAR CONNECTOR FOR PILE, PANELS, AND PIPES

CROSS-REFERENCE TO RELATED APPLICATIONS

This nonprovisional application is a continuation of and claims priority to provisional application No. 62/131,395, entitled "RECTILINEAR CONNECTOR FOR PILE, PANELS, AND PIPES," filed Mar. 11, 2015 by the same inventors.

BACKGROUND OF THE INVENTION

1. Field of the Invention

This invention relates, generally, to interconnecting support structures. More particularly, it relates to a rectangular interlock that is inexpensive to manufacture and is easy to install 2. Description of the Prior Art The invention has been devised in particular, though not necessarily solely, for piling applications. A pile is a structural element usually driven vertically into the ground to meet a structural or environmental need. For example, piles are used to form retaining walls in various applications, including but not limited to foundation excavations, waterfront seawalls, and cofferdams.

The primary function of a sheet pile is to withstand bending. Therefore, piles can take many forms, including but not limited to a pipe, beam, angle, C-channel, T-shape, Z-shape, flat sheet, and bent sheet. Often a series of piles are interconnected to meet the necessary structural or environmental need. These interconnected piles are often preferable to alternative forms of retaining wall, which include contiguous bore piles, soldier or driven bore piles, and diaphragm walls. Use of connected pile systems limits the extent of excavation associated with the alternative systems and significantly reduces material costs.

Sheet piles have many applications, but perhaps the most common is for creating cofferdams, support of excavations, and water cut off walls. Regardless of the pile section, or how it is formed (cold formed, hot forged, extruded, etc.), the piles require an interlock to interconnect a series of piles together to form a piling assembly or system.

Typically, pile interlocks include a socket formed in one end of a pile and a plug formed in the opposite end of the pile, or alternatively, two interlocking hooks on either end of a pile. This arrangement enables the facile end-to-end interlocking of sheet piles. A number of different pile interlocks have been manufactured to serve as sockets and plugs, however, the existing interlocks are complex, expensive to produce, restricted to a limited number of attachment points, and some are unable to create a watertight seal. Currently, interlocks are hot rolled or cold rolled directly from the ends of the sheet piles. Hot rolling interlocks from the ends of a sheet pile is an extremely expensive and difficult process. Cold rolling is less expensive and less difficult, but produces less precise interlocks that typically fail to provide a watertight interlock.

Accordingly, what is needed is a more efficient, effective, and less expensive interlock design and method of attachment. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved pile interlock and method of attachment is now met by a new, useful, and nonobvious invention.

The present invention provides a more efficient method of producing interlocks by (1) bending existing sheets or tubes into a socket and securing the socket to an end of a structure, such as a sheet pile, and (2) securing a plug to a structure, such as a sheet pile, or to an intermediate plate, which is then secured to a structure, such as a sheet pile.

An embodiment of the pile interlock assembly includes a first pile having a length/height and a width extending between a first end and a second end. An elongate socket is secured to the first end of the pile such that a length of the socket extends in the same direction as the length of the pile. An elongate plug is secured to the second end of the pile such that a length of the plug extends in the same direction as the length of the pile.

The elongate socket includes a receiving cavity sized to receive an elongate plug secured to a second pile. The socket has an open rectangular cross-section with a back wall perpendicularly oriented with respect to, and integrated into, both a top wall and a bottom wall. The top wall and bottom wall are parallel to each other and extend roughly the same distance in the same direction.

The top wall is integrated into an upper flange, which is perpendicular to the top wall and parallel to the back wall. The bottom wall is integrated into a lower flange, which is also perpendicular to the bottom wall and parallel to the back wall. The upper and lower flanges extend towards each other and a passage exists between the free ends of the upper and lower flanges. The passage between the flanges extends the length of the socket and is adapted to receive a section of the second pile attached to the second elongate plug.

The plug also has rectangular cross-section defined by an outer perimeter, which is sized to be ensleeved by the elongate socket. A lateral surface acts as a flange-contacting surface when the plug is disposed within a second socket. The term "lateral" refers to a direction towards the perimeter of the plug when in end view, i.e. in a direction parallel to the plane of the paper. The flange-contacting surface includes a pile receipt extending inwardly from the flange-contacting surface. The inwardly disposed pile receipt thereby enables the second end of the pile to be internally, with respect to the flange-contacting surface, attached to the plug. As a result, the flange-contacting surface remains free of obstructions and is able to evenly distribute contacting forces along upper and lower flanges of the second socket.

In an embodiment, the pile receipt has a rectangular cross-section with an extent of the rectangular cross-section extending inwardly from the flange-contacting surface. The width of the rectangular cross-section is sized such that the second end of the pile is secured to the plug by press fitting the second end of the pile into the pile receipt. An embodiment includes bevels between the flange-contacting surface and the pile receipt, such that groove welds can be applied between the bevels and the second end of the pile.

In an embodiment, the width of the rectangular cross-section of the pile receipt extends inwardly from the flange-contacting surface, and the extent of the rectangular cross-section is sized such that gaps are present on either side of the second end of the pile when the second end of the pile is disposed in the pile receipt. The gaps provide adequate spacing for securing either side of the second end of the pile to the pile receipt through groove welds.

In an embodiment, the pile receipt extends the entire length of the plug. In an embodiment, the sockets and plugs have a square cross-section.

The novel method of securing interlocks to a pile includes providing an elongate socket and a first elongate plug. The provided socket includes a receiving cavity sized to receive a second elongate plug secured to a second pile. The socket has an open rectangular cross-section having a back wall generally perpendicular to and integrated into both a top wall and a bottom wall, wherein the top wall and bottom wall are parallel to each other and extend in the same distance, in the same direction.

The top wall is integrated into an upper flange, which is perpendicular to the top wall and parallel to the back wall. The bottom wall is integrated into a lower flange, which is also perpendicular to the bottom wall and parallel to the back wall. The upper and lower flanges extend towards each other and a passage exists between the free ends of the upper and lower flanges. The passage between the flanges extends the length of the socket and is adapted to receive a section of the second pile attached to the second elongate plug.

The novel method further includes securing the elongate socket to a first end of the pile such that a length of the socket extends in the same direction as a length of the pile. In addition, a flat planar section of the first end of the pile mates with the top wall, the bottom wall, or the back wall of the elongate socket.

The provided plug also has rectangular cross-section defined by an outer perimeter, which is sized to be ensleeved by the elongate socket. A lateral surface acts as a flange-contacting surface when the plug is disposed within a second socket. The flange-contacting surface includes a pile receipt extending inwardly from the flange-contacting surface. The inwardly disposed pile receipt thereby allows the second end of the pile to be internally, with respect to the flange-contacting surface, attached to the plug. As a result, the flange-contacting surface remains free of obstructions and is able to evenly distribute contacting forces along upper and lower flanges of the second socket.

The novel method includes securing the first plug to a second end of the pile by attaching the second end of the pile to the pile receipt. The plug and pile are oriented such that a length of the plug extends in the same direction as the length of the pile.

In an embodiment, the step of securing the first plug to a second end of the pile includes press fitting the second end of the pile into the pile receipt when the extent of the rectangular cross-section of the pile receipt extends inwardly from the flange-contacting surface. The width of the rectangular cross-section is sized to retain the second end of the pile when press-fit into the pile receipt.

In an embodiment, the step of securing the first plug to a second end of the pile includes welding the second end of the pile to the pile receipt when the width of the rectangular cross-section of the pile receipt extends inwardly from the flange-contacting surface, and the extent of the rectangular cross-section is sized such that gaps are present on either side of the second end of the pile when the second end of the pile is disposed in the pile receipt. The gaps thereby provide adequate spacing for securing either side of the second end of the pile to the pile receipt through groove welds.

An important object of the invention is to provide a square interlock that has a low cost of manufacture, that mates easily with sheet piles, and has three planes for planarly attaching the female socket to allow sufficient flexibility for installation.

This invention is unique because its square shape enables the engagement of both flat flanges and edge corners within the interlock to benefit the connection in different ways. The edges have a tendency to prevent the flow of solids and fluids through said interlock, and the flat flanges are a significant improvement in accepting a load transverse to the interlock. When pulling the interlock apart, the resultant force is imparted largely on the flat flanges. This better distributes the load within the connection and thus reduces the prying action present in connections that are elliptical/circular. The square connection also avoids the point shear force action present in purely angular connections and has comparable connection flexibility.

Currently hot rolled sheet pile is manufactured with either elliptical or angular interlocks by means of hot rolling. The formation of the interlock integral with the sheet make hot rolled sheet pile the most challenging steel section to make. In one preferred form of the invention, the square connection shape is formed on an extruded or hot forged material by grinding to form the inner end and cut, routed, and carved into the rough form for the outer end. This improves the connection tolerance after the sheet pile has been shaped with its flanges. A square section can readily be shaped by grinding, cutting, and routing and this is not feasible with an elliptical shape.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE INVENTION

The present invention includes a novel interlock for structural members and a method of attaching said novel interlock. The novel interlock includes a male plug and a female socket. The cross-section of the plug is rectangular, preferably square. The cross-section of the socket is an open rectangular shaped (or rectangular C-shaped) and sized to receive the plug. Both the plug and the socket may be secured directly to an existing pile or may include intermediate extension plates that attach to the piles. For clarity and simplicity, the descriptions regarding FIGS. 1-6, identify the plug and socket as being secured to a pile. It should be noted, however, that "pile end 119" as described with respect to FIGS. 1-5 can also be interpreted as "intermediate plate end 119," which acts as an intermediate extension plate between the plug/socket and the pile.

Figure 1:
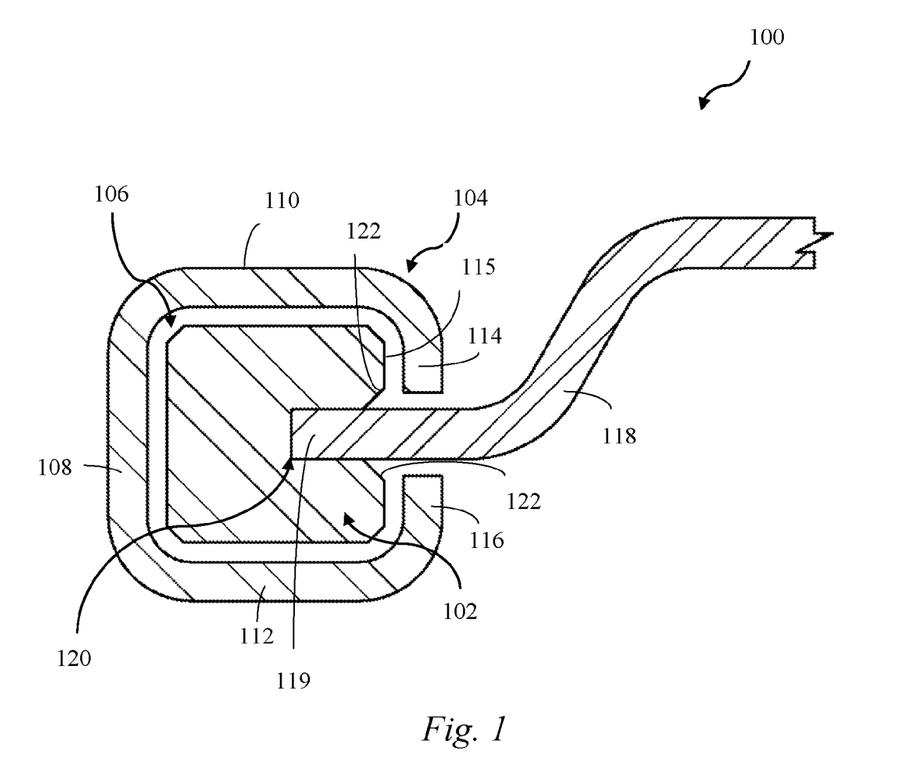
FIG. 1 is an end view of an embodiment of the novel square interlock.

Referring now to FIG. 1, an exemplary embodiment of the novel interlock is denoted as a whole by the reference numeral 100. Interlock 100 includes male plug 102 having a generally square cross-section and female socket 104 having a generally open square cross-section. Socket 104 includes receiving cavity 106 having a size adapted to receive plug 102. Plug 102 and receiving cavity 106 are sized with respect to each other such that socket 104 snugly ensleeves plug 102.

The square cross-sections of socket 104 and plug 102 are particularity beneficial for maintaining a watertight interlock. Fluids entering socket 104 will experience a substantial decrease in flow-rate when flowing around the ninety-degree turns found in the interlock assembly. As the flow-rate decreases, particles carried by the flow lose their velocity and are deposited. The decreased flow-rates around the corners facilitate the collection of deposited material, which ultimately increases rigidity and creates a watertight seal between the interlocked piles.

Socket 104, when viewed in an end view or cross-sectional view, includes back wall 108, top wall 110, and bottom wall 112. Top and bottom walls 110, 112 are integrated into back wall 108 through rounded corners. Top and bottom walls 110, 112 are also integrated into a discontinuous front wall comprising of upper flange 114 and lower flange 116. Upper and lower flanges 114, 116 are generally parallel to back wall 108; upper wall 110 is generally parallel to lower wall 112; and upper flange 114, lower flange 116, and back wall 108 are generally perpendicular to upper and lower walls 110, 112 to create the square shape of socket 104.

Upper and lower flanges 114, 116 are spaced apart by a distance that is greater than the cross-sectional width of a section of pile attached to plug 102, but less than the width of plug 102. As a result, a particular pile 118 and attached plug 102, intended to interlock with a particular socket 104, must be driven vertically into socket 104. Once plug 102 is secured in socket 104, the interlock is secured regardless of any tensile and torsional forces applied to the piles housing the respective socket and plug.

The shape of socket 104 is particularly beneficial with respect to production costs. Typically, interlocks and sockets are hot rolled from sheet metal to form the desired shape. Hot rolling can be time confusing, expensive, and difficult. Socket 104, however, can be easily created from readily available tubes having a square cross-section, or bent from a sheet. As a result, the production costs of socket 104 are substantially reduced compared to the current art.

Plug 102 has a generally square cross-sectional shape composed of four sides. Flange-contacting surface 115 includes pile receipt 120 disposed therein. As depicted in FIG. 1, pile receipt 120, in an exemplary embodiment of plug 102, is generally rectangular with the extent of the pile receipt extending inwardly from flange-contacting surface 115. Inwardly extending pile receipt 120 provides an increased surface area with which pile end 119 contacts plug 102. The increased surface area results in a stronger connection than is possible with end 119 simply abutting plug 102. In addition, the connection is easier to establish because end 119 can be adhered to or press fit into pile receipt 120.

The embodiment shown in FIG. 1 also includes bevels 122 at the entrance of pile receipt 120. Bevels 122 create a gap to apply a groove weld (not shown) between each bevel 122 and pile end 119. A groove weld is preferred because it is stronger than a fillet weld, which would be the only welding option if the entrance were not beveled. Furthermore, the groove weld remains inboard with respect to flange-contacting surface 115. By containing the connections within flange-contacting surface 115, there is less chance of the welds interfering with socket 104 slidingly receiving plug 102. Therefore, the connection of plug 102 to pile 118 will never compromise the necessary clearance required for socket 104 to receive plug 102.

Moreover, flange-contacting surface 115 remains free of any obstructions when the welds are inboard of flange-contacting surface 115. Maintaining an obstruction free and flat flange-contacting surface 115 is critical for evenly distributing any applied force onto upper and lower flanges 114, 116. Any welds existing between flange-contacting surface 115 and either flange 114, 116 would create a minimally distributed point force near the free end of either flange 114, 116, which would impose a moment force on the flange. The interlock would effectively become weaker and more likely to fail under smaller loads.

Figure 2:
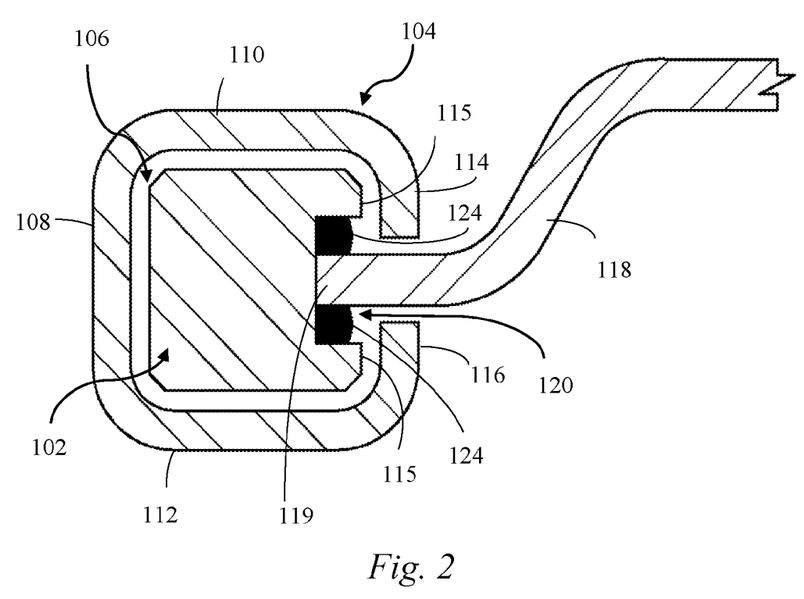
FIG. 2 is an end view of an embodiment of the novel square interlock.

Referring now to FIG. 2, an embodiment of plug 102 includes pile receipt 120 having a rectangular cross-section where the width of pile receipt 120 extends inwardly from the outer perimeter of plug 102 and the extent is perpendicular with pile end 119. The extent of pile receipt 120 is greater than the width of pile end 119, but less than the length of flange-contacting surface 115, which creates gaps on either side of pile end 119 within pile receipt 120. As shown in FIG. 2, these gaps are filled with groove welds 124 to secure plug 102 to pile end 119. Similar to the embodiment shown in FIG. 1, groove welds 124 remain inboard with respect to the outer perimeter of plug 102 to prevent welds 124 from interfering with socket 104 slidingly receiving plug 102 and to maintain even load distribution between flange-contacting surface 115 and flanges 114, 116.

Figure 3:
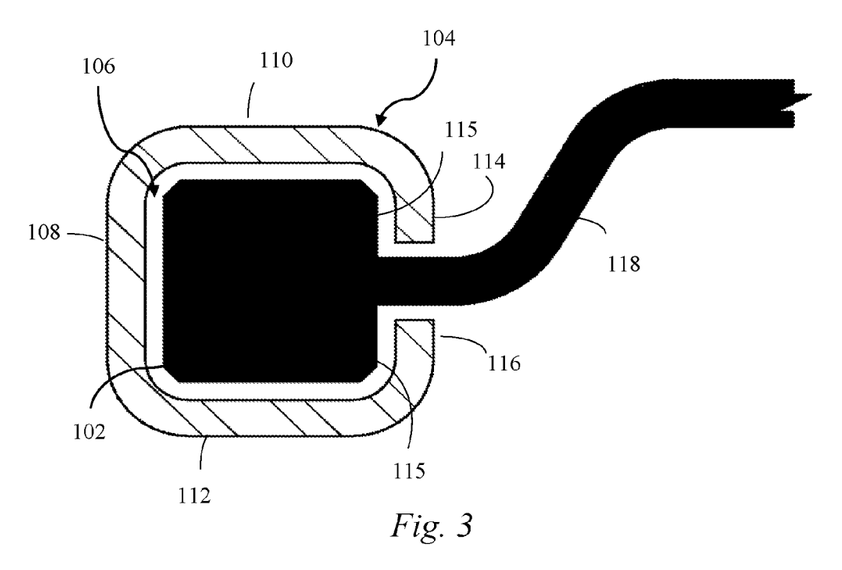
FIG. 3 is an end view of an embodiment of the novel square interlock.

FIG. 3 depicts another embodiment, wherein plug 102 is directly formed onto pile end 119 through an extrusion process. The extrusion results in a plug 102 seamlessly integrated into pile end 119. Consequently, the connection of plug 102 to pile 118 will never compromise the necessary clearance required for socket 104 to receive plug 102 or compromise the load distribution between flange-contacting surface 115 and flanges 114, 116.

Figure 4A:
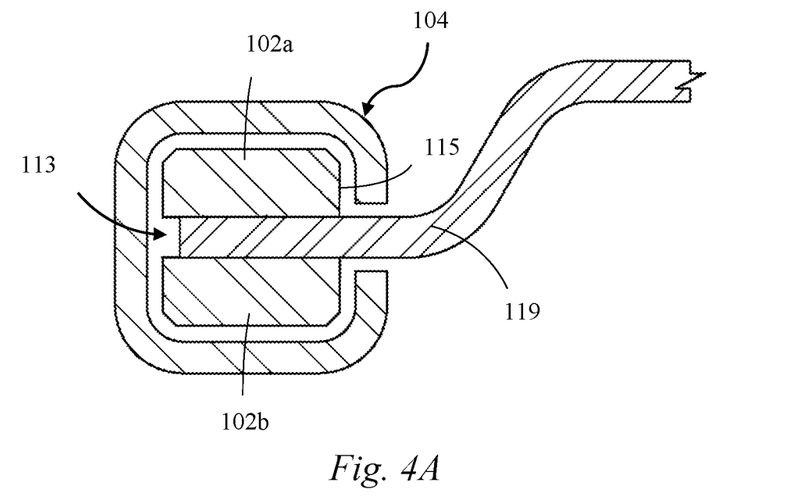
FIG. 4A is an end view of an embodiment of the plug.
Figure 4B:
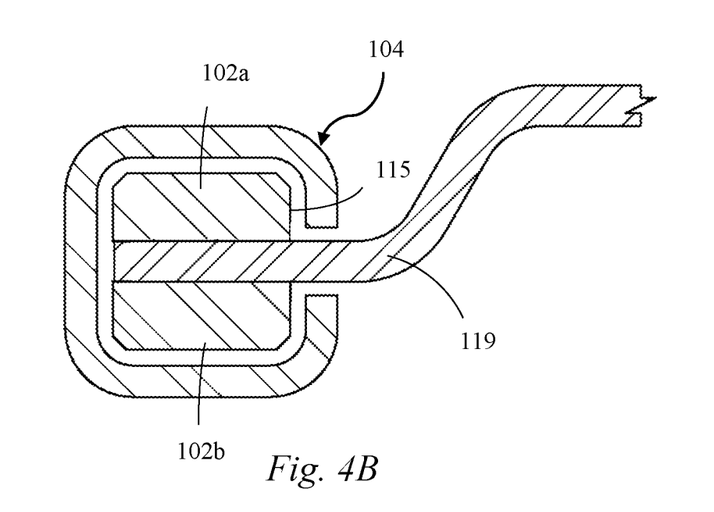
FIG. 4B is an end view of an embodiment of the plug.

FIGS. 4A-4B illustrate an embodiment having plug 102 comprising of two halves disposed in clamping fashion around pile end 119, effectively creating a pile receipt extending all the way through the plug. This embodiment has the same benefits that come with securing pile end 119 within the outer perimeter of plug 102, while also having the additional benefits with respect to cost to manufacture and the ease of assembly. Each half 102a and 102b is preferably equal in size, generally rectangular, and preferably pre-manufactured/readily available members that can simply be fixed to end 119. Therefore, the halves 102a, 102b can be cheaply purchased or mass-produced with no requirement for complex features.

As shown in FIG. 4A, pile end 119 does not extend completely through plug 102, such that channel 113 is provide on a surface opposite from flange-contacting surface 115. Channel 113 provides an access to secure end 119 to plug 102 by groove or slot welds. As depicted in FIG. 4B, halves 102a, 102b may be secured to end 119, such that there does not exist a channel on the lateral surface opposite from flange-contacting surface 115. In an embodiment, the halves 102A, 102b may be secured to end 115 through contact welding or an adhesive.

Figure 5A:
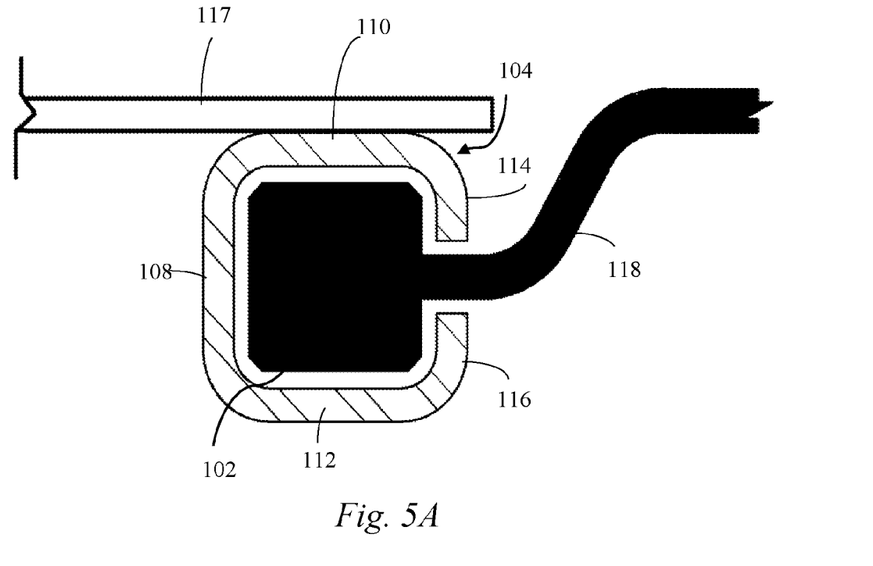
FIG. 5A is an end view of an embodiment of the novel square interlock highlighting a planar attachment between a pile and the socket.
Figure 5B:
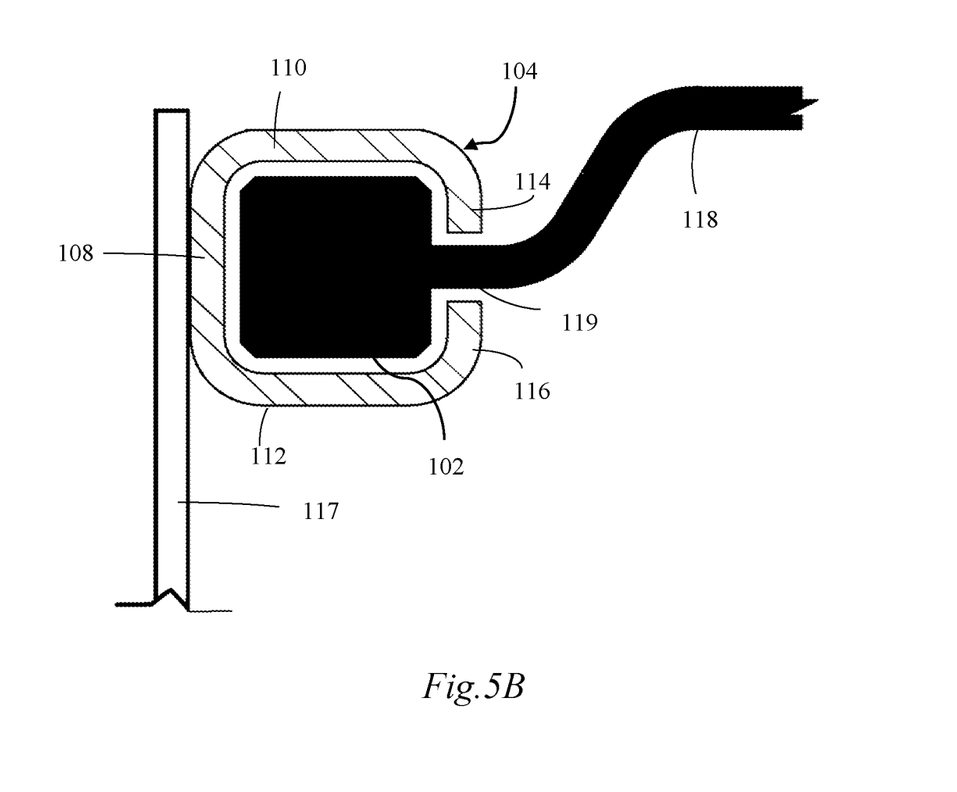
FIG. 5B is an end view of an embodiment of the novel square interlock highlighting a planar attachment between a pile and the socket.
Figure 5C:
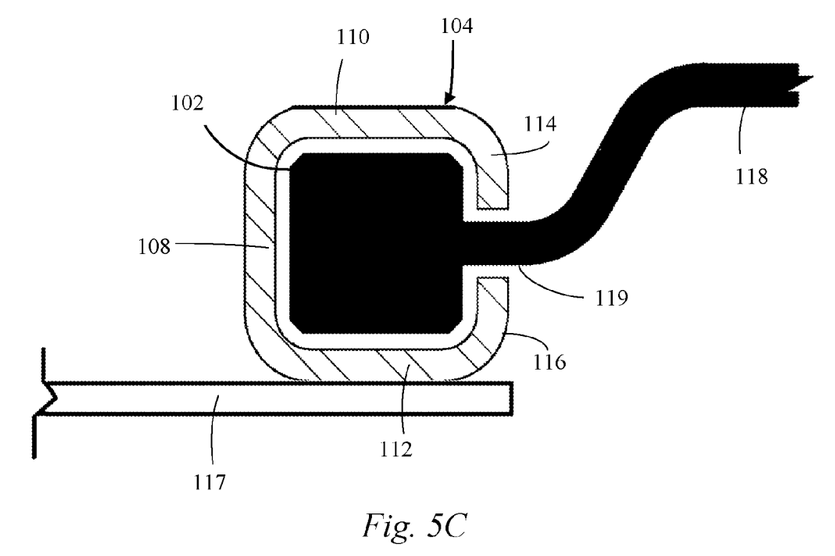
FIG. 5C is an end view of an embodiment of the novel square interlock highlighting a planar attachment between a pile and the socket.

Referring now to FIGS. 5A-5C, the rectangular cross-section of socket 104 is further advantageous because it provides three flat planes on which pile end 117 may attach. Creating a strong lasting connection by mating two flat surfaces, such as the connection shown in FIGS. 5A-5C, is more effective than abutting end 117 to a flat wall and substantially more effective than attaching end 117 to a curved surface, such as a pipe. The stronger more effective planar connection can be accomplished along at least three walls with a rectangular shaped socket. As shown in FIG. 5A, a lateral surface of end 117 is mated to top wall 110 of socket 104. FIG. 5B depicts the lateral surface of end 117 mated to back wall 108, and FIG. 5C depicts the lateral surface of end 117 mated to back bottom wall 112.

Figure 6A:
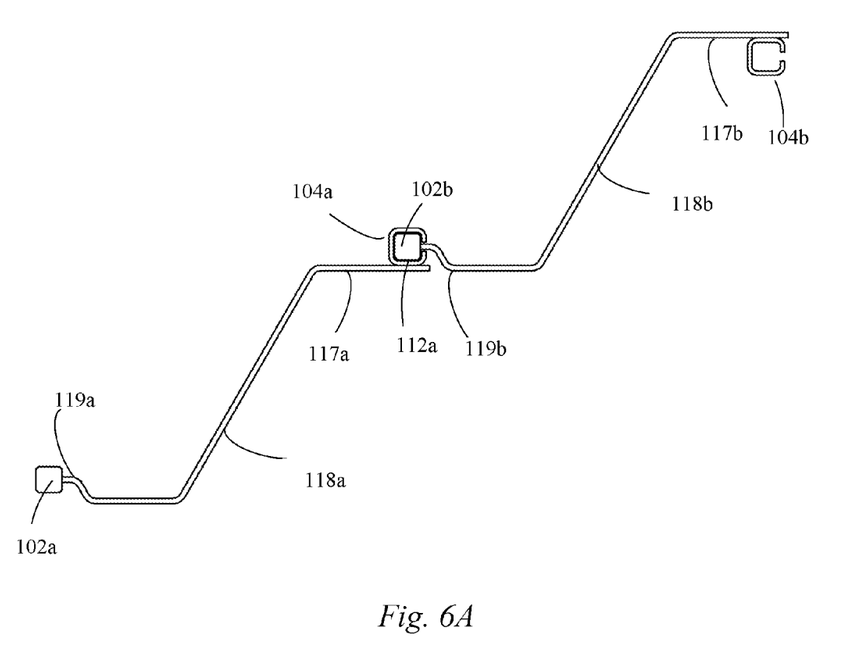
FIG. 6A is an end view two interlocked piles highlighting one possible configuration resulting from the versatility in the socket attachment.
Figure 6B:
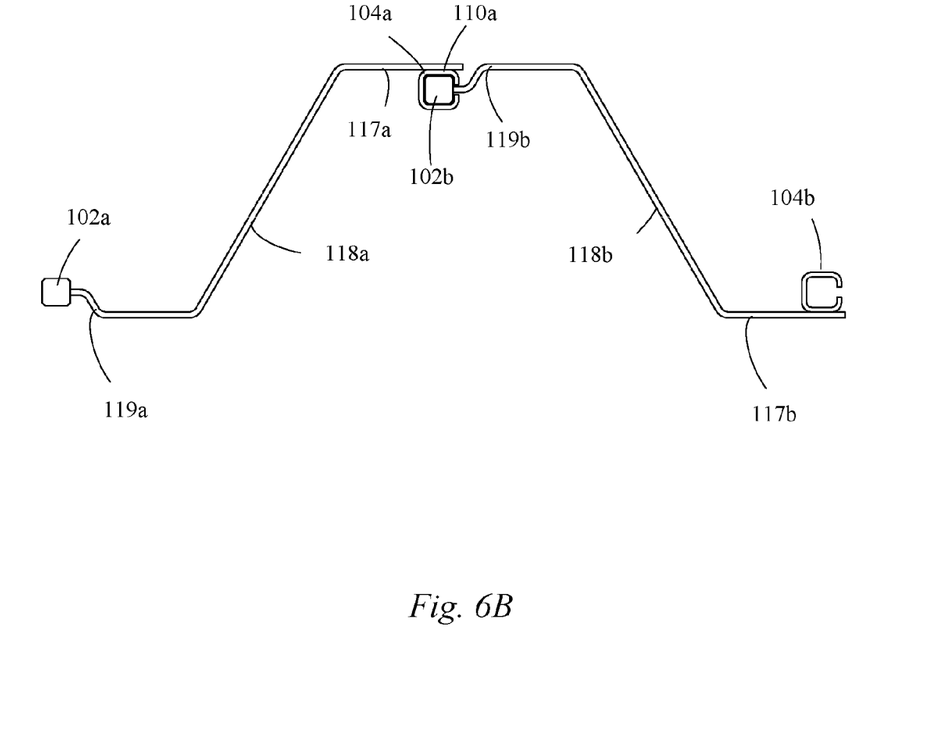
FIG. 6B is an end view two interlocked piles highlighting one possible configuration resulting from the versatility in the socket attachment.
Figure 6C:
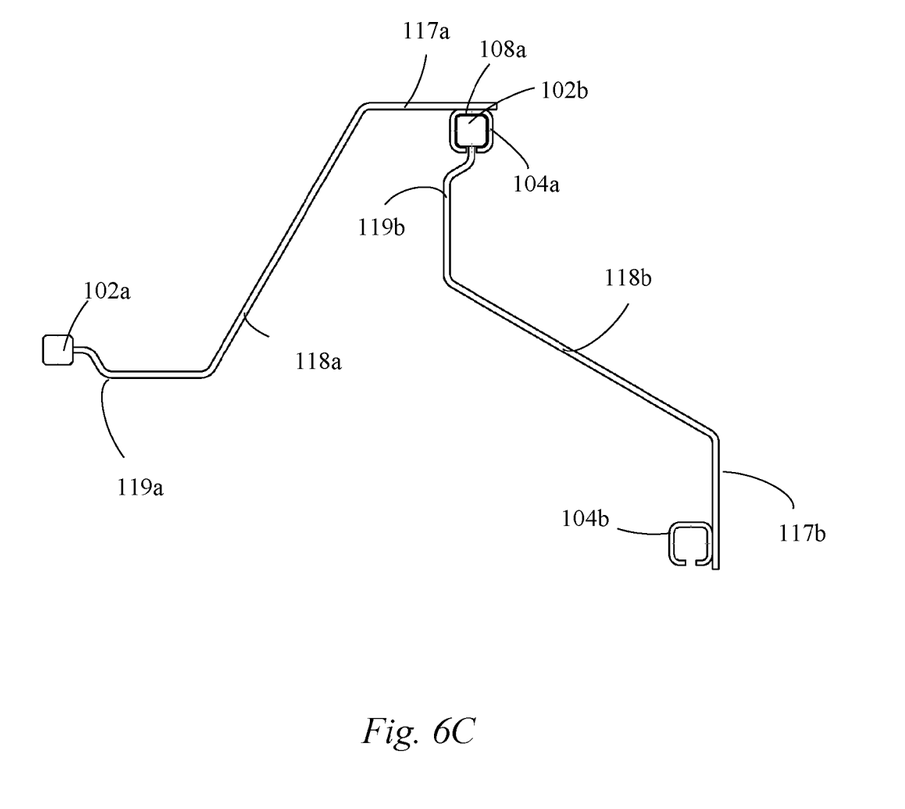
FIG. 6C is an end view two interlocked piles highlighting one possible configuration resulting from the versatility in the socket attachment.

The variability in attaching sockets 104 to piles 118 provides versatility in arranging and interconnecting a plurality of piles. As shown in FIG. 6A, two piles 118a, 118b each include socket 104a, 104b and plug 102a, 102b. Socket 104a is attached to pile 118a at pile end 117a by mating bottom wall 112a to a flat lateral surface. FIG. 6B illustrates socket 104a attached to pile end 117a by mating top wall 110a to a flat lateral surface and FIG. 6C depicts socket 104a attached to pile end 117a by mating back wall 108a to a flat lateral surface. As shown in FIGS. 6A-6C, socket 104a can be planarly attached to a flat surface on pile 118a through any of the walls 108a, 110a, or 112a to create different pile arrangements. The interlocks always remain the same, so there is never a need to attach different interlocks to create different arrangements.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:
1. An interlock assembly, comprising:
an elongate socket having a receiving cavity sized to receive an elongate plug;
the elongate socket includes:
an open rectangular cross-section having a back wall generally perpendicular to and integrated into both a top wall and a bottom wall, wherein the top wall and bottom wall are parallel to each other and extend the same distance in the same direction;
the top wall integrated into an upper flange, wherein the upper flange is perpendicular to the top wall and parallel to the back wall;
the bottom wall integrated into a lower flange, wherein the lower flange is perpendicular to the bottom wall and parallel to the back wall;
the upper and lower flanges extend towards each other and a passage exists between free ends of the upper and lower flanges;
the passage extends the length of the socket and is adapted to receive a section of a plate attached to the elongate plug;
the plug further includes:
a rectangular cross-section having an outer perimeter sized to be ensleeved by the elongate socket;
a lateral surface that acts as a flange-contacting surface when the plug is disposed within the socket, wherein the flange-contacting surface includes a plate receipt extending inwardly from the flange-contacting surface, thereby allowing an end of a plate to be internally, with respect to the flange-contacting surface, attached to the plug such that the flange-contacting surface remains free of obstructions and evenly distributes contacting forces along the upper and lower flanges when the flange-contacting surface contacts the upper and lower flanges; and
the plug includes bevels between the flange-contacting surface and the plate receipt, such that groove welds can be applied between the bevels and the end of the plate.

2. The interlock of claim 1, wherein the socket and plug have a square cross-section.

3. The interlock of claim 1, wherein the plate is a sheet pile.

4. The interlock of claim 1, wherein the plate is an intermediate plate adapted to be secured to a pile.

5. An interlock assembly comprising:
an elongate socket having a receiving cavity sized to receive an elongate plug;
the elongate socket includes:

an open cross-section having a back wall generally perpendicular to and integrated into both a top wall and a bottom wall, wherein the top wall and bottom wall are parallel to each other and extend the same distance in the same direction;

the top wall integrated into an upper flange, wherein the upper flange is perpendicular to the top wall and parallel to the back wall;

the bottom wall integrated into a lower flange, wherein the lower flange is perpendicular to the bottom wall and parallel to the back wall;

the upper and lower flanges extend towards each other and a passage exists between free ends of the upper and lower flanges;

the passage extends the length of the socket and is adapted to receive a section of a plate attached to the elongate plug; the plug further includes:

a cross-section having an outer perimeter sized to be ensleeved by the elongate socket;

a lateral surface that acts as a flange-contacting surface when the plug is disposed within the socket, wherein the flange-contacting surface includes a plate receipt extending inwardly from the flange-contacting surface, thereby allowing an end of a plate to be internally, with respect to the flange-contacting surface, attached to the plug such that the flange-contacting surface remains free of obstructions and evenly distributes contacting forces along the upper and lower flanges when the flange-contacting surface contacts the upper and lower flanges; and the plate receipt having a cross-section, a width of the cross-section extends inwardly from the flange-contacting surface, and an extent of the cross-section is sized such that gaps are present on either side of the end of the plate when the end of the plate is disposed in the plate receipt, the gaps thereby providing space for securing either side of the end of the plate to the plate receipt through groove welds.

6. The interlock of claim 5, wherein the socket and plug have a square cross-section.

7. The interlock of claim 5, wherein the plate is a sheet pile.

8. The interlock of claim 5, wherein the plate is an intermediate plate adapted to be secured to a pile.

9. An interlock assembly, comprising:
an elongate socket having a receiving cavity sized to receive an elongate plug;
the elongate socket includes:
an open rectangular cross-section having a back wall generally perpendicular to and integrated into both a top wall and a bottom wall, wherein the top wall and bottom wall are parallel to each other and extend the same distance in the same direction;
the top wall integrated into an upper flange, wherein the upper flange is perpendicular to the top wall and parallel to the back wall;
the bottom wall integrated into a lower flange, wherein the lower flange is perpendicular to the bottom wall and parallel to the back wall;
the upper and lower flanges extend towards each other and a passage exists between free ends of the upper and lower flanges;
the passage extends the length of the socket and is adapted to receive a section of a plate attached to the elongate plug;
the plug further includes:
a rectangular cross-section having an outer perimeter sized to be ensleeved by the elongate socket;
a lateral surface that acts as a flange-contacting surface when the plug is disposed within the socket, wherein the flange-contacting surface includes a plate receipt extending inwardly from the flange-contacting surface, thereby allowing an end of a plate to be internally, with respect to the flange-contacting surface, attached to the plug such that the flange-contacting surface remains free of obstructions and evenly distributes contacting forces along the upper and lower flanges when the flange-contacting surface contacts the upper and lower flanges; and
the plate receipt extending the length of the plug.

10. The interlock of claim 9, wherein the socket and plug have a square cross-section.

11. The interlock of claim 9, wherein the plate is a sheet pile.

12. The interlock of claim 9, wherein the plate is an intermediate plate adapted to be secured to a pile.

13. An interlock assembly, comprising:
an elongate socket having a receiving cavity sized to receive an elongate plug;
the elongate socket includes:
an open rectangular cross-section having a back wall generally perpendicular to and integrated into both a top wall and a bottom wall, wherein the top wall and bottom wall are parallel to each other and extend the same distance in the same direction;
the top wall integrated into an upper flange, wherein the upper flange is perpendicular to the top wall and parallel to the back wall;
the bottom wall integrated into a lower flange, wherein the lower flange is perpendicular to the bottom wall and parallel to the back wall;
the upper and lower flanges extend towards each other and a passage exists between free ends of the upper and lower flanges;
the passage extends the length of the socket and is adapted to receive a section of a plate attached to the elongate plug;
the plug further includes:
a rectangular cross-section having an outer perimeter sized to be ensleeved by the elongate socket;
a lateral surface providing a flange-contacting surface when the plug is disposed within the socket, wherein the flange-contacting surface includes a plate receipt extending inwardly from the flange-contacting surface, thereby allowing an end of a plate to be internally, with respect to the flange-contacting surface, attached to the plug such that the flange-contacting surface remains free of obstructions and evenly distributes contacting forces along the upper and lower flanges when the flange-contacting surface contacts the upper and lower flanges; and
the plate receipt extending from the flange-contacting surface through the entire cross-section of the plug such that the plug is divided into a first half and a second half with the end of the plate sandwiched between the first and second halves of the plug.

14. The interlock of claim 13, wherein the socket and plug have a square cross-section.

15. The interlock of claim 13, wherein the plate is a sheet pile.

16. The interlock of claim 13, wherein the plate is an intermediate plate adapted to be secured to a pile.

\* \* \* \* \*